United States Patent
Harada (10) Patent No.: US 9,810,933 B2
(45) Date of Patent: *Nov. 7, 2017

(54) LIQUID CRYSTAL DISPLAY DEVICE AND METHOD OF DRIVING THE SAME

(71) Applicant: JAPAN DISPLAY INC., Minato-ku (JP)

(72) Inventor: Kenji Harada, Ishikawa-ken (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,064

(22) Filed: Jul. 22, 2014

(65) Prior Publication Data

US 2014/0333862 A1 Nov. 13, 2014

Related U.S. Application Data

(62) Division of application No. 12/912,100, filed on Oct. 26, 2010, now Pat. No. 8,836,684.

(30) Foreign Application Priority Data

Oct. 30, 2009 (JP) .................................. 2009-251250

(51) Int. Cl.
G06F 3/038 (2013.01)
G09G 5/00 (2006.01)
(Continued)

(52) U.S. Cl.
CPC ....... G02F 1/13306 (2013.01); G09G 3/3655 (2013.01); *G09G 3/3677* (2013.01);
(Continued)

(58) Field of Classification Search
CPC ............... G09G 3/3674; G09G 3/3677; G09G 2330/027; G09G 2310/0245;
(Continued)

(56) References Cited

U.S. PATENT DOCUMENTS

2004/0174329 A1* 9/2004 Yamada ............... G09G 3/2011 345/89
2009/0009503 A1* 1/2009 Tajiri ........................... 345/211
(Continued)

FOREIGN PATENT DOCUMENTS

| JP | 2008-170995 | 7/2008 |
|---|---|---|
| JP | 2009-104050 | 5/2009 |
| JP | 2009-134063 | 6/2009 |

OTHER PUBLICATIONS

Japanese Office Action issued Jul. 12, 2011, in Patent Application No. 2009-251250 (English-language translation only).

*Primary Examiner* — Insa Sadio
(74) *Attorney, Agent, or Firm* — Oblon, McClelland, Maier & Neustadt, L.L.P.

(57) ABSTRACT

A liquid crystal display device includes a plurality of common electrodes arranged so as to counter pixel electrodes extending in the row direction on a substrate. First and second voltage supply lines to supply first and second voltages to the common electrodes are connected with the common electrodes through a first switch circuit. A second switch circuit is arranged between the first voltage supply line and signal lines to switch a connection between the first voltage supply line and the signal lines. A gate open circuit is connected to scan lines to simultaneously supply a signal to switch on the pixel electrodes to all the scan lines. In case the power supply of the liquid crystal display device is turned off, a control circuit starts the power OFF driving operation to set the potential of the pixel electrode and the common electrode to substantially same by switching the first and second switch circuits.

19 Claims, 3 Drawing Sheets

(51) Int. Cl.
 *G02F 1/133* (2006.01)
 *G09G 3/36* (2006.01)
(52) U.S. Cl.
 CPC ... *G09G 3/3688* (2013.01); *G09G 2310/0245* (2013.01); *G09G 2310/0297* (2013.01)
(58) Field of Classification Search
 CPC ......... G09G 2310/0297; G09G 3/3655; G09G 3/3688; G02F 1/13306
 USPC .................................................. 345/211, 87
 See application file for complete search history.

(56) References Cited

U.S. PATENT DOCUMENTS

| | | | |
|---|---|---|---|
| 2009/0079684 A1* | 3/2009 | Watanabe ............ | G09G 3/3655 345/92 |
| 2009/0184912 A1* | 7/2009 | Eun et al. ....................... | 345/94 |
| 2009/0243978 A1* | 10/2009 | Yamamoto ........... | G09G 3/3233 345/76 |

* cited by examiner

LIQUID CRYSTAL DISPLAY DEVICE AND METHOD OF DRIVING THE SAME

CROSS-REFERENCE TO RELATED APPLICATION

This application is a divisional of U.S. application Ser. No. 12/912,100 filed Oct. 26, 2010, and is based upon and claims the benefit of priority from prior Japanese Patent Application No. 2009-251250, filed Oct. 30, 2009, the entire contents of each of which are incorporated herein by reference.

FIELD

The present invention relates to a liquid crystal display device and a method of driving the same, and more particularly to a liquid crystal display device using an active matrix and a method of driving the same.

BACKGROUND

The active-matrix type liquid crystal display device is equipped with a liquid crystal layer held between a pair of substrates which counter mutually, and a display portion which consists of a plurality of display pixels arranged in the shape of a matrix. One of the pair of substrates includes scan lines arranged along with row lines of the display pixels, and signal lines arranged along with column lines of the display pixels in the matrix. An alignment state of the liquid crystal molecule contained in the liquid crystal layer is controlled by an electrical field impressed to the liquid crystal layer.

Recently, liquid crystal display devices such as an IPS (In-Plane Switching) mode type and a FFS (Fringe Field Switching) mode type using a lateral electrical field have been proposed. The IPS mode type and the FFS mode type include a plurality of first electrodes arranged in the matrix and a second electrode that counters the first electrodes on one of the substrates, and the state of an alignment of the liquid crystal molecule contained in the liquid crystal layer is controlled by the lateral electrical field generated between the first and second electrodes.

In the liquid crystal display, a line inversion driving method is proposed, in which the polarity of an impressed voltage to the liquid crystal layer for every scan line is inversed for preventing generation of a flicker phenomenon. When the line inversion driving method is adopted in the IPS mode or the FFS mode, the second electrode is arranged for every scan line, and the voltage supplied to the second electrode for every one-frame period is changed to either of the high (H) level and the low (L) level to inverse the polarity of the voltage impressed to the liquid crystal layer. In this structure, the alignment of the liquid crystal molecule contained in the liquid crystal layer is controlled by two kinds of voltages supplied to the second electrode and a picture signal sequentially written in the first electrode.

For example, when a power supply is turned off in the liquid crystal display device in a normally black mode, first, black data (picture signal corresponding to the black display) is written in all the display pixels based on a predetermined sequence in order to prevent disturbance of a screen by performing the black display. Then, the power supply to the liquid crystal panel is shut by turning off a power switch inserted in a power supply line after a predetermined time passes.

However, when two kinds of voltages with positive and negative are supplied to the second electrode, even if the black data is written in all the display pixels, the time for electric discharge of the high level common potential is different from that of the low level common potential after the power supply is turned off. Therefore, an incidental image, such as a lateral line shape may be generated.

Moreover, since the writing of the black data is sequentially performed by scan operation in every scan line like the writing of the normal display data, it takes time of at least one field period to write the black data in one screen. For this reason, the prior method can not respond to sudden power-off which occurs momentary. Accordingly, it was difficult to avoid the generation of the incidental lateral line.

A liquid crystal display device including an auxiliary capacitance coupled with a pixel capacitance and an auxiliary capacitance line for supplying a voltage to the auxiliary capacitance is proposed to make amplitude of the signal supplied to the signal lines small. Conventionally, a liquid crystal display device is proposed, in which the liquid crystal display device includes a low-voltage line to supply a low level voltage and a high-voltage line to supply a high voltage to the auxiliary capacitance line respectively, and a switching circuit to connect the auxiliary capacitance line with one of the low-level voltage line and the high-voltage line (refer to a Japanese Laid Open Patent Application No. 2009-104050).

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device and a method of driving the liquid display device according to an exemplary embodiment of the present invention will now be described with reference to the accompanying drawings wherein the same or like reference numerals designate the same or corresponding parts throughout the several views. The liquid crystal display device according to this embodiment uses a normally black mode in the FFS mode type.

According to one embodiment, a liquid crystal display device includes: a substrate; a plurality of first electrodes arranged in a matrix of rows and columns on the substrate; scan lines extending along with the first electrodes arranged in the row direction; signal lines extending along with the first electrodes arranged in the column direction; a pixel switch arranged in an intersection portion of the scan line and the column line to switch a connection between the signal line and the first electrode by a scan signal applied to the scan line; a scan line driving circuit to sequentially scan the scan lines; a plurality of second electrodes arranged so as to counter the first electrodes through an insulating layer and extend along with the pixels in the row direction; a first voltage supply line to supply a first voltage to the second electrode; a second voltage supply line to supply a second voltage to the second electrode; a control circuit; a first switch circuit arranged between the first and second voltage supply lines and the second electrodes to switch a connection between the first voltage supply line and the second electrodes, and a connection between the second voltage supply line and the second electrodes by a control signal outputted from the control circuit; a second switch circuit arranged between the first voltage supply line and the signal line to switch a connection between the first voltage supply line and the signal line by the control signal outputted from the control circuit; and a gate open circuit to receive signals from the scan line driving circuit and the control circuit, the gate open circuit supplying a signal to switch on the pixel switch to the scan line.

According to other embodiment, a method of driving a liquid crystal display device includes; a substrate, a plurality of first electrodes arranged in a matrix of rows and columns on the substrate, scan lines extending along with the first electrodes arranged in the row direction, signal lines extending along with the first electrodes arranged in the column direction, a pixel switch arranged in an intersection portion of the scan line and the column line to switch a connection between the signal line and the first electrode by a scan signal supplied to the scan line, a scan line driving circuit to sequentially scan the scan lines, a plurality of second electrodes arranged so as to counter the first electrodes in the row direction through an insulating layer, a first voltage supply line to supply a first voltage to the second electrode, a second voltage supply line to supply a second voltage to the second electrode, a control circuit, a first switch circuit arranged between the first and second voltage supply lines and the second electrodes to switch a connection between the first voltage supply line and the second electrodes, and a connection between the second voltage supply line and the second electrodes by a control signal outputted from the control circuit, a second switch circuit arranged between the first voltage supply line and the signal line to switch a connection between the first voltage supply line and the signal line by the control signal outputted from the control circuit, and a gate open circuit to receive signals from the scan line driving circuit and the control circuit and supply a signal to switch on the pixel switch, the method comprising the steps: when the power supply to the liquid crystal display device is turned off, (a) connecting the first voltage supply line with the second electrode by controlling the first switch circuit; (b) connecting the first voltage supply line with the signal line by controlling the second switch circuit; and (c) supplying a signal to simultaneously switch on the pixel switches connected with all the signal lines to the gate open circuit.

Figure 1:
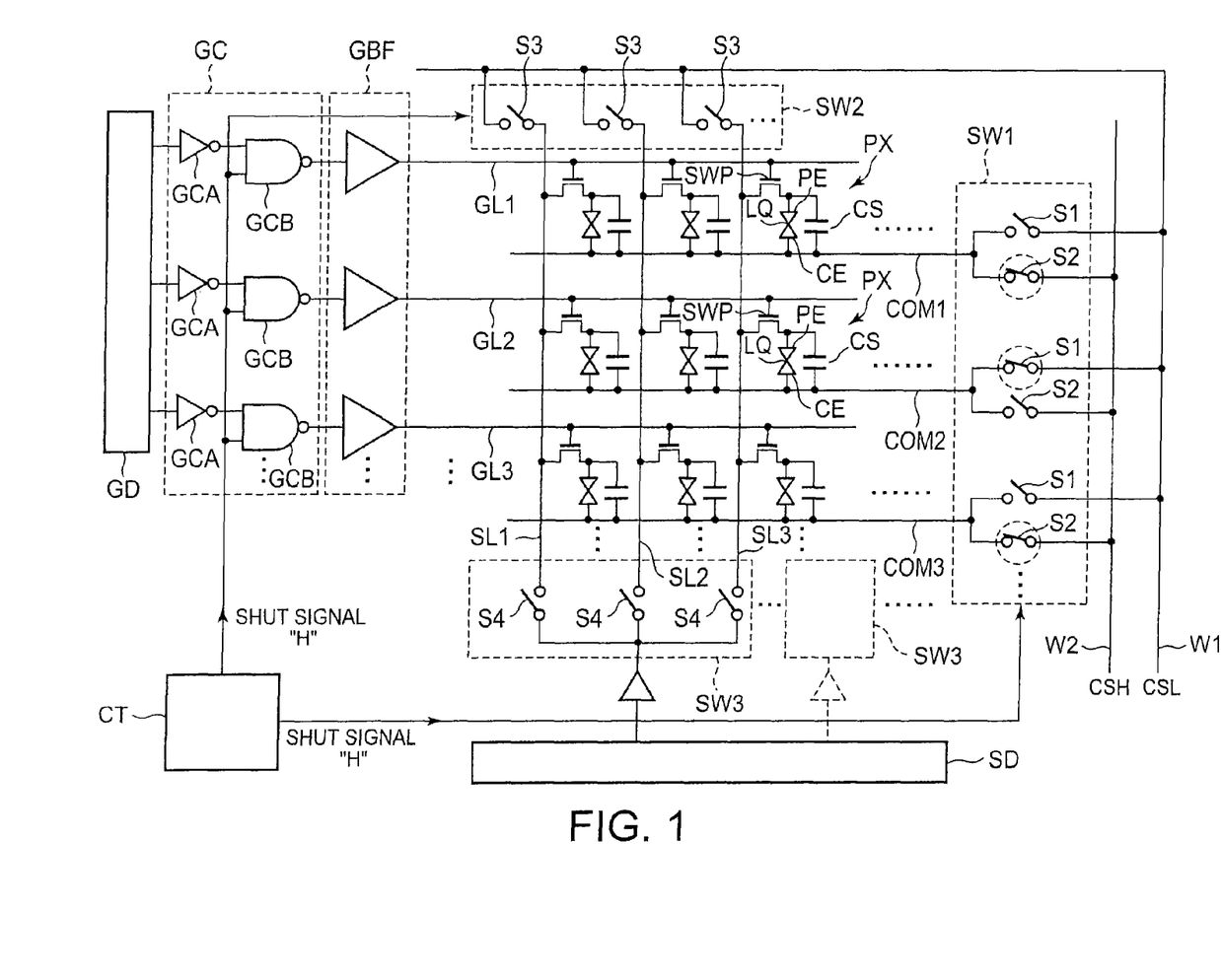
FIG. 1 is a figure for explaining an example of a normal display driving operation of a liquid crystal display device according to one embodiment of the present invention.
Figure 2:
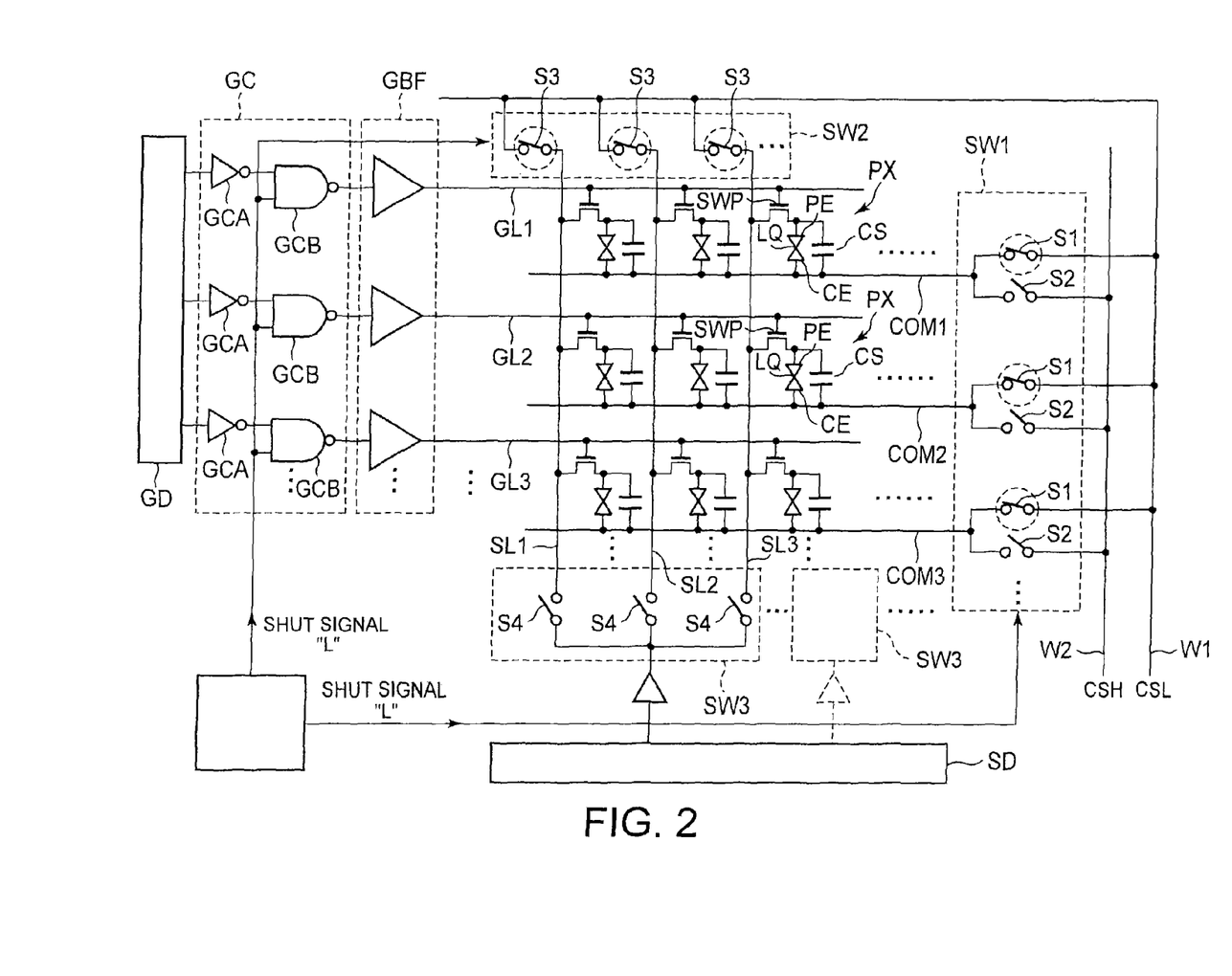
FIG. 2 is a figure for explaining an example of the power OFF driving operation of the liquid crystal display according to the embodiment of the present invention.

As shown in FIG. 1 and FIG. 2, the liquid crystal display device according to this embodiment includes a pair of substrates, that is, an array substrate (not shown) and a counter substrate (not shown) opposite the array substrate, a liquid crystal layer LQ held between the pair of substrates, and a display portion (not shown) having a plurality of display pixels PX arranged in the shape of a matrix.

The array substrate includes a transparent insulating substrate (not shown), a pixel electrode PE arranged in each display pixel PX, scan lines GL (GL1, GL2, GL3 - - - ) extending along with the row lines of the pixel electrodes PE, signal lines SL (SL1, SL2, SL3 - - - ) extending along with the column lines of the pixel electrodes PE, pixel switches SWP arranged near the positions where the scan lines GL and the signal lines SL cross each other, and common electrodes COM (COM1, COM2, COM3 - - - ) arranged so as to face the pixel electrodes PE through an insulating layer (not shown) formed on the transparent array substrate, respectively.

The pixel switch SWP includes a thin film transistor (TFT: Thin Film Transistor) as a switching element. A gate electrode of the thin film transistor is electrically connected with a corresponding scan line GL (or formed integrally). A source electrode of the thin film transistor is electrically connected with a corresponding signal line SL (or formed integrally). A drain electrode of the thin film transistor is electrically connected with a corresponding pixel electrode PE (or formed integrally).

If the ON voltage is impressed to the gate electrode of the thin film transistor, an electrical connection is formed between the source electrode and the drain electrode, and a picture signal is supplied to the pixel electrode PE from the corresponding signal line SL. Liquid crystal capacitance is formed by the picture signal impressed to the pixel electrode PE and the common voltage impressed to the common electrode COM.

A plurality of slits are formed in the pixel electrode PE with a predetermined interval therebetween, and a lateral electrical field generates between the pixel electrode PE and the common electrode COM arranged through an insulating layer. The state for alignment of the liquid crystal molecule contained in the liquid crystal layer LQ is controlled by the lateral electrical field. Each display pixel PX further includes an auxiliary capacitance CS coupled with the liquid crystal capacitance. The liquid crystal capacitance is stored in the liquid crystal layer by electrical field impressed to the liquid crystal layer. The auxiliary capacitance CS is a capacitance produced between the pixel electrode PE and the common electrode COM.

The common electrodes COM are arranged so as to extend in approximately parallel with the scan lines GL, and each common electrode COM counters the pixel electrodes PE arranged in the row direction. The array substrate includes a first voltage supply line W1 and a second voltage supply line W2 to supply two kinds of common voltages to the common electrode COM. A low level common voltage (CSL) is impressed to the first voltage supply line W1, and a high level common voltage (CSH) is impressed to the second voltage supply line W2. In this embodiment, the low level common voltage (CSL) is set to an approximate ground voltage.

The one end portion of the common electrode COM is connected to the first switching circuit SW1. The first switching circuit SW1 includes a switching element S1 to switch a connection between the common electrode COM and the first voltage supply line W1, and a switching element S2 to switch a connection between the common electrode COM and the second voltage supply line W2. The ON or OFF state of the switching elements S1 and S2 is controlled by a control signal SHUT outputted from a control circuit CT to switch a normal display driving operation and a power OFF driving operation.

One end portion of the signal line SL is connected to a second switching circuit SW2. The second switching circuit SW2 includes a switching element S3 which switches a connection between the signal line SL and the first voltage supply line W1. The ON or OFF of the switching element S3 is controlled by the SHUT signal outputted from the control circuit CT.

The other end portion of the signal line SL is connected to a third switching circuit SW3. The third switching circuit SW3 includes output terminals of a signal line driving circuit SD and switching elements S4 to switch a connection with the signal line SL. The switching circuit SW3 is constituted so that the picture signal outputted from one output terminal of the signal line driving circuit SD is supplied to one of three signal lines SL. In this embodiment, a multiplexer circuit is employed, that is, a plurality of third switching circuits SW3 having three switching elements S4 respectively are arranged in the scan line direction. Of course, the third switching circuits SW3 may be formed so that the switching elements S4 are arranged respectively corresponding to all the output terminals of the signal line driving circuit SD without using the multiplexer circuit.

One end of the scan line GL is connected to a scan line driving circuit GD through a gate open circuit GC and a gate buffer circuit GBF. The gate open circuit GC includes a NOT circuit GCA to receive the scan signal outputted from the scan line driving circuit GD, a NAND circuit GCB to receive the signal outputted from the NOT circuit GCA and the SHUT signal outputted from the control circuit CT. The signal outputted from the NAND circuit GCB of the gate open circuit GC is supplied to a buffer of the gate buffer circuit GBF and is supplied to the scan line GL through the buffer.

FIG. 1 shows one example of a structure of the liquid crystal display device when the normal display driving operation is performed to supply the picture signal to the pixel electrode PE. In the case shown in FIG. 1, the SHUT signal is high (H) level. At this time, a common electrode COM1 is connected to the second voltage supply line W2 by the switching element S2, a common electrode COM2 is connected to the first voltage supply line W1 by the switching element S1, and a common electrode COM3 is connected to the second voltage supply line W2 by the switching element S2. That is, voltages having different level are respectively supplied to adjoining common electrodes COM.

After one frame period, the common electrode COM1 is connected to the first voltage supply line W1 by the switching element S1, the common electrode COM2 is connected to the second voltage supply line W2 by the switching element S2, and the common electrode COM3 is connected to the first voltage supply line W1 by the switching element S1. Thus, the voltage level supplied to common electrode COM changes for every one frame period.

Figure 3:
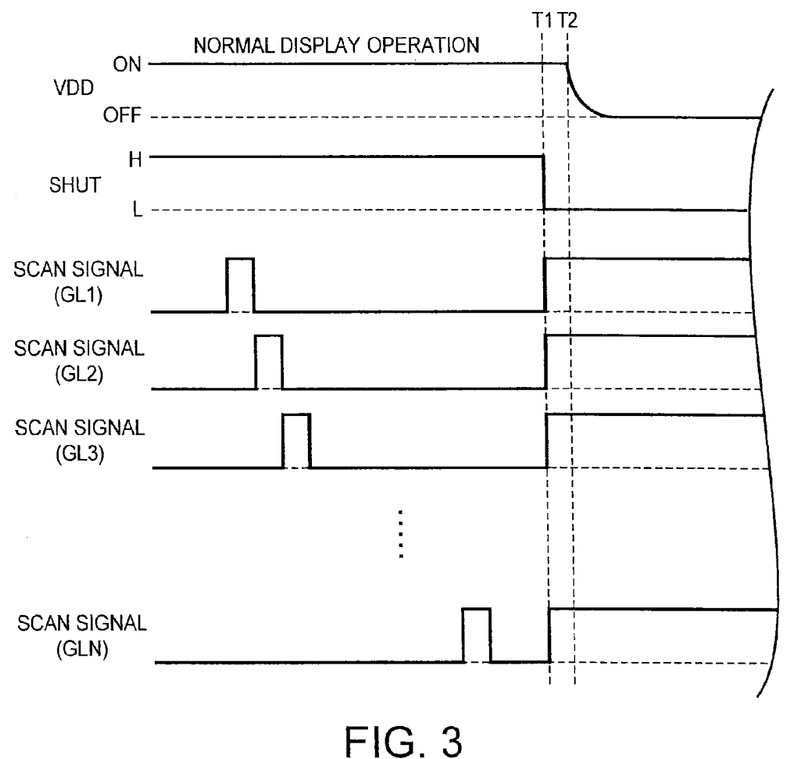
FIG. 3 is a timing chart for explaining an example of the driving method of the liquid crystal display according to the embodiment of the present invention.

The switching elements S3 of the second switch circuit SW2 are turned off by the SHUT signal. The NAND circuit GCB in the gate open circuit GC transmits the scan signals outputted from the scan line driving circuit GD to the gate buffer circuit GBF by the signal outputted from the NOT circuit GCA and the SHUT signal. Then, as shown in FIG. 3, the scan lines GL are sequentially driven for every one horizontal period.

The switching elements S4 in the third switch circuit SW3 are sequentially turned on during one horizontal period, and the picture signals outputted from one output terminal of the signal driving circuit SD are supplied to three signal lines SL. The picture signals supplied to the signal lines SL are supplied to the pixel electrodes PE through the pixel switches SWP. In this embodiment, the multiplexer circuit is adopted. The plurality of third switch circuits SW3 are sequentially operated for all the output terminals of the signal driving circuit SD.

FIG. 2 shows one example of a structure of the liquid crystal display device when the power OFF driving operation is performed. If the power supply to the liquid crystal display device is turned off, the control circuit CT starts the power OFF driving operation. As shown in FIG. 3, the control circuit CT starts the power OFF driving operation from timing T1 when the power supply was turned off. At timing T2 when a predetermined time passes from the power OFF, a switch inserted in a power supply line (not shown) shuts the power supply to the control circuit CT. In addition, at the time of the normal display driving operation, the power voltage VDD is anytime supplied to the power supply line.

In the case shown in FIG. 2, the SHUT signal is a low (L) level. All the common electrodes COM are connected to the first voltage supply line W1 by the switching element S1 in the first circuit SW1 at this time. That is, the common voltage (CSL) of low level is supplied to all the common electrodes COM from the first voltage supply line W1.

The switching elements S3 of the second switch circuit SW2 are turned on by the SHUT signal. The NAND circuit GCB of the gate open circuit GC outputs the scan signal which turns on the pixel switch SWP by the signal outputted from the NOT circuit GCA and the SHUT signal. The signal outputted from the NAND circuit GCB is supplied to the scan line GL through the gate buffer circuit GBF. Then, as shown in FIG. 3, the scan signals which turn on the pixel switches SWP are simultaneously supplied to all the scan lines GL.

The switching elements S4 of the third switch circuit SW3 are simultaneously turned off by the SHUT signal. Therefore, the common voltage (CSL) of low level is supplied to the signal lines SL from the first supply line W1 through the second circuit SW2, and the common voltage (CSL) of low level is also supplied to all the pixel electrodes PE through the pixel switch SWP.

Therefore, since the potential supplied to the pixel electrode PE and the potential supplied to the common electrode COM becomes approximately same, the value of the potential difference for controlling the state of the alignment of the liquid crystal molecule becomes substantially zero. Thereby, the display portion becomes a black display state.

As mentioned above, if the liquid crystal display device performs the power OFF driving operation, the signals corresponding to the black display can be simultaneously supplied to all pixel electrodes. Thereby, the time (time from the timing T1 to the timing T2) to charge the pixel electrode can be shortened. Moreover, since the common voltages having same potential are supplied to all the common electrodes COM, the electric discharge time of the adjoining common electrodes COM becomes substantially equal after the supply of the power voltage VDD to the control circuit CT was turned off.

Therefore, the writing of the signal corresponding to the black display completes before the power supply voltage VDD turns off. Accordingly, the incident image is not displayed after the power supply is turned off. Furthermore, even if it is a case where the power supply of the liquid crystal display device is turned off suddenly, it becomes possible to complete the signal writing to the pixel electrode PE and common electrode COM before the supply of the power voltage VDD from the power supply line is shut. Thereby, even if it is the case where the power supply fails suddenly, the black display can be performed without the incident image.

Furthermore, according to this embodiment, since the first voltage supply line W1 is used to supply the common voltage to both the signal line SL and the common electrode COM when the power supply to the liquid crystal display is shut, it is not necessary to provide additional voltage supply lines.

That is, according to the liquid crystal display device and the driving method of the same in this embodiment, it is possible to provide a high quality liquid crystal display device.

In the liquid crystal display device according to the above-mentioned embodiment, when the power supply of the liquid crystal display device is turned off, while the common electrode COM is connected with the first voltage supply line W1 in the first switching circuit SW1, the signal line SL is connected with the first voltage supply line W1 in the second switching circuit SW2. However, when the power supply of the liquid crystal display device is turned off, while the common electrode COM may be connected with the second voltage supply line W2 in the first switching circuit SW1, the signal line SL may be connected with the second voltage supply line W2 in the second switching circuit SW2.

Since the same potential is supplied to the common electrode COM and the signal wire SL in each case, the same effect as the liquid crystal display device according to the above-mentioned embodiment can be achieved.

Moreover, although the liquid crystal display device according to the above-mentioned embodiment adopts the FFS mode, the present invention is applicable to the liquid crystal display device, in which the polarity of the potential impressed to the liquid crystal layer LQ is inversed for every one or more scan lines by changing the common voltage. Consequently, the same effect as the liquid crystal display device according to the above-mentioned embodiment can be achieved.

While certain embodiments have been described, these embodiments have been presented by way of example only, and are not intended to limit the scope of the inventions. In practice, the structural element can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal display device, comprising:
a first substrate including:
a plurality of first electrodes arranged in a matrix of rows and columns;
scan lines extending along with the first electrodes arranged in the row direction;
signal lines extending along with the first electrodes arranged in the column direction;
a pixel switch arranged in an intersection portion of the scan line and the signal line to switch a connection between the signal line and the first electrode by a scan signal applied to the scan line;
a scan line driving circuit to sequentially scan the scan lines;
a plurality of second electrodes arranged so as to counter the first electrodes with an insulating layer positioned between the first electrode and the second electrode, and the second electrodes extending along with the first electrodes in the row direction;
a first voltage supply line to supply a first voltage to the second electrode;
a second voltage supply line to supply a second voltage to the second electrode;
a control circuit;
a first switch circuit arranged between the first and second voltage supply lines and the second electrodes to switch a connection between the first voltage supply line and the second electrodes, and a connection between the second voltage supply line and the second electrodes by a control signal outputted from the control circuit;
a second switch circuit arranged between the first voltage supply line and the signal line to switch a connection between the first voltage supply line and the signal line by the control signal outputted from the control circuit; and
a gate open circuit to receive signals from the scan line driving circuit and the control circuit, the gate open circuit supplying a signal to switch on the pixel switch to the scan line;
a second substrate opposing the first substrate; and
a liquid crystal layer held between the first substrate and the second substrate,
wherein
the control circuit is configured to supply a signal to the first switch circuit, the second switch circuit, and the gate open circuit, the signal being supplied to connect the first voltage supply line with the second electrode by controlling the first switch circuit and to connect the first voltage supply line with the signal line by controlling the second switch circuit, and being simultaneously supplied to all the scan lines through the gate open circuit to simultaneously switch on all the pixel switches connected to all the scan lines, when the liquid crystal display device is powered off, and
the control circuit is further configured to supply a voltage from the first voltage supply line to all the first electrodes, when the liquid crystal display device is powered off.

2. The liquid crystal display device according to claim 1, wherein in case the power supply to the liquid crystal display device is turned off, the voltage supplied to the first electrode is substantially same as that supplied to the second electrode.

3. The liquid crystal display device according to claim 1, wherein the liquid crystal display device uses one of the IPS mode and FFS mode.

4. The liquid crystal display device according to claim 1, wherein the first electrode is a pixel electrode and the second electrode is a common electrode.

5. The liquid crystal display device according to claim 1, wherein
in case the power supply of the liquid crystal display device is turned off, the control circuit starts the power OFF driving operation, and the power supply to the control circuit is turned off after a predetermined time passes.

6. The liquid crystal display device according to claim 1, wherein
the first switch circuit includes a first switching element to switch a connection between the first voltage supply line and the second electrode and a second switching element to switch the connection between the second voltage supply line and the second electrode under control by the control circuit,
the second switch circuit includes a third switching element to switch the connection between the first voltage supply line and the signal line under control by the control circuit, and the control circuit is further configured to turn on the first switching element, to turn off the second switching element, and to turn on the third switching element, when the liquid crystal display device is powered off.

7. The liquid crystal display device according to claim 1, wherein
the control circuit is further configured to supply the voltage from the first voltage supply line to all the second electrodes, when the liquid crystal display device is powered off.

8. A liquid crystal display device, comprising:
a first substrate;
a second substrate opposite the first substrate including:
a plurality of pixel electrodes arranged in a matrix of rows and columns,
scan lines extending along with the pixel electrodes arranged in the row direction,
signal lines extending along the pixel electrodes arranged in the column direction,
a pixel switch arranged in an intersection portion of the scan line and the signal line to switch a connection between the signal line and the pixel electrode by a scan signal applied to the scan line,
a scan line driving circuit to sequentially scan the scan lines,
a source line driving circuit to supply picture signals to the signal lines,
a plurality of common electrodes arranged so as to counter the pixel electrodes with an insulating layer positioned between the pixel electrode and the common electrode, the common electrodes extending along with the pixel electrodes in the row direction,
a first voltage supply line to supply a first voltage to the common electrode,
a second voltage supply line to supply a second voltage to the common electrode,
a control circuit,
a first switch circuit arranged between the first and second voltage supply lines and the common electrodes to switch a connection between the first voltage supply line and the common electrodes, and a connection between the second voltage supply line and the common electrodes by a control signal outputted from the control circuit,
a second switch circuit arranged between the first voltage supply line and the signal line to switch a connection between the first voltage supply line and the signal line by the control signal outputted from the control circuit, and
a gate open circuit to receive signals from the scan line driving circuit and the control circuit, the gate open circuit supplying a signal to switch on the pixel electrode,
a liquid crystal layer held between the first and second substrates;
wherein
in case the power supply of the liquid crystal display device is turned off, the control circuit starts the power OFF driving operation to set the potential of the pixel electrodes and the voltage of the common electrodes substantially equal, and the power supply to the control circuit is turned off after a predetermined time passes,
the control circuit is configured to supply a signal to the first switch circuit, the second switch circuit, and the gate open circuit, the signal being supplied to connect the first voltage supply line with the common electrode by controlling the first switch circuit and to connect the first voltage supply line with the signal line by controlling the second switch circuit, and being simultaneously supplied to all the scan lines through the gate open circuit to simultaneously switch on all the pixel switches connected to all the scan lines, when the liquid crystal display device is powered off, and
the control circuit is further configured to supply a voltage from the first voltage supply line to all the first electrodes, when the liquid crystal display device is powered off.

9. The liquid crystal display device according to claim 8, wherein in case the power supply to the liquid crystal display device is turned off, a black display signal is written in all the pixel electrodes.

10. The liquid crystal display device according to claim 8, wherein the liquid crystal display device uses one of the IPS mode and FFS mode.

11. The liquid crystal display device according to claim 8, wherein the polarity of the potential impressed to the liquid crystal layer is inversed for every one or more scan lines by changing the potential of the common electrodes.

12. The liquid crystal display device according to claim 8, wherein
the first switch circuit includes a first switching element to switch a connection between the first voltage supply line and the common electrode and a second switching element to switch the connection between the second voltage supply line and the common electrode under control by the control circuit, and
the second switch circuit includes a third switching element to switch the connection between the first voltage supply line and the signal line under control by the control circuit, and
the control circuit is further configured to turn on the first switching element, to turn off the second switching element, and to turn on the third switching element, when the liquid crystal display device is powered off.

13. A method of driving a liquid crystal display device including:
a first substrate including:
a plurality of first electrodes arranged in a matrix of rows and columns,
scan lines extending along with the first electrodes arranged in the row direction,
signal lines extending along with the first electrodes arranged in the column direction,
a pixel switch arranged in an intersection portion of the scan line and the signal line to switch a connection between the signal line and the first electrode by a scan signal supplied to the scan line,
a scan line driving circuit to sequentially scan the scan lines,
a plurality of second electrodes arranged so as to counter the first electrodes in the row direction with an insulating layer positioned between the first electrodes and the second electrodes,
a first voltage supply line to supply a first voltage to the second electrode,
a second voltage supply line to supply a second voltage to the second electrode,
a control circuit,
a first switch circuit arranged between the first and second voltage supply lines and the second electrodes to switch a connection between the first voltage supply line and the second electrodes, and a connection between the second voltage supply line and the second electrodes by a control signal outputted from the control circuit, a second switch circuit arranged between the first voltage supply line and the signal line to switch a connection between the first voltage supply line and the signal line by the control signal outputted from the control circuit, and a gate open circuit to receive signals from the scan line driving circuit and the control circuit and supply a signal to switch on the pixel switch, a second substrate opposing the first substrate; and a liquid crystal layer held between the first substrate and the second substrate, the control circuit supplying a signal to the first switch circuit, the second switch circuit, and the gate open circuit, the signal being supplied to connect the first voltage supply line with the second electrode by controlling the first switch circuit and to connect the first voltage supply line with the signal line by controlling the second switch circuit, and being simultaneously supplied to all the scan lines through the gate open circuit to simultaneously switch on all the pixel switches connected to all the scan lines, when the liquid crystal display device is powered off, the method comprising: when the power supply to the liquid crystal display device is turned off, (a) connecting the first voltage supply line with the second electrode by controlling the first switch circuit;

(b) connecting the first voltage supply line with the signal line by controlling the second switch circuit;

(c) supplying a signal to simultaneously switch on the pixel switches connected with all the scan lines to the gate open circuit, and (d) supplying a voltage from the first voltage supply line to all the first electrodes, when the liquid crystal display device is powered off.

14. The method of driving a liquid crystal display device according to claim 13, wherein in case the power supply of the liquid crystal display device is turned off, the control circuit starts the power OFF driving operation, and the power supply to the control circuit is turned off after a predetermined time passes.

15. The method of driving a liquid crystal display device according to claim 14, wherein in the case the power supply of the liquid crystal display device is turned off, a black display signal is written in all the pixel electrodes.

16. The method of driving a liquid crystal display device according to claim 13, wherein the liquid crystal display device uses one of the IPS mode and FFS mode.

17. The method of driving a liquid crystal display device according to claim 13, wherein the first electrode is a pixel electrode and the second electrode is a common electrode.

18. The method of driving a liquid crystal display device according to claim 13, wherein the polarity of the potential impressed to the liquid crystal layer is inversed for every one or more scan lines by changing the voltage of the second electrode.

19. The method of driving a liquid crystal display device according to claim 13, wherein the first switch circuit includes a first switching element to switch a connection between the first voltage supply line and the second electrode and a second switching element to switch the connection between the second voltage supply line and the second electrode under control by the control circuit, and the second switch circuit includes a third switching element to switch the connection between the first voltage supply line and the signal line under control by the control circuit, the method further comprising:

turning on the first switching element, turning off the second switching element, and turning on the third switching element via the control circuit, when the liquid crystal display device is powered off.

* * * * *